UNITED STATES PATENT OFFICE.

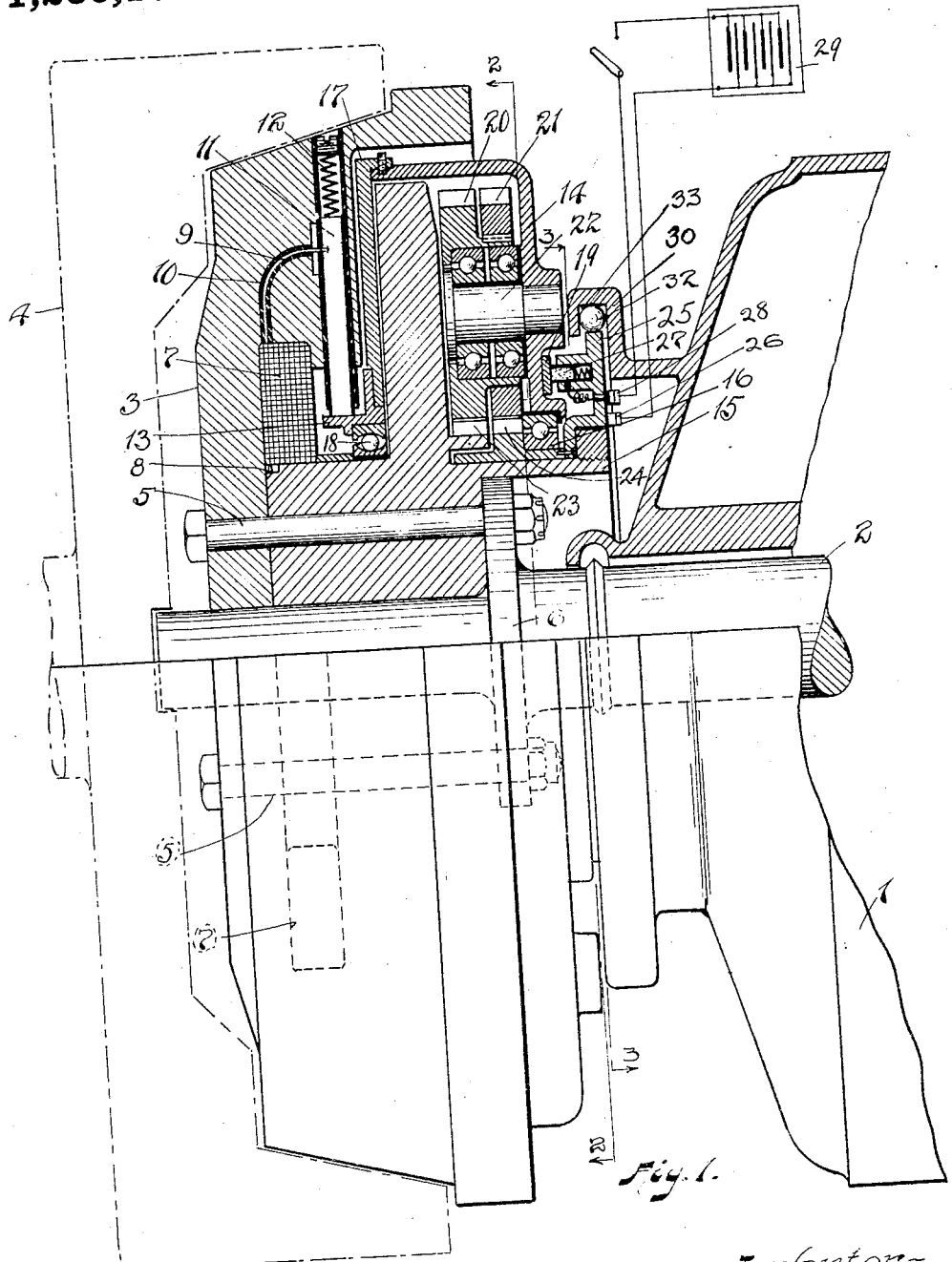

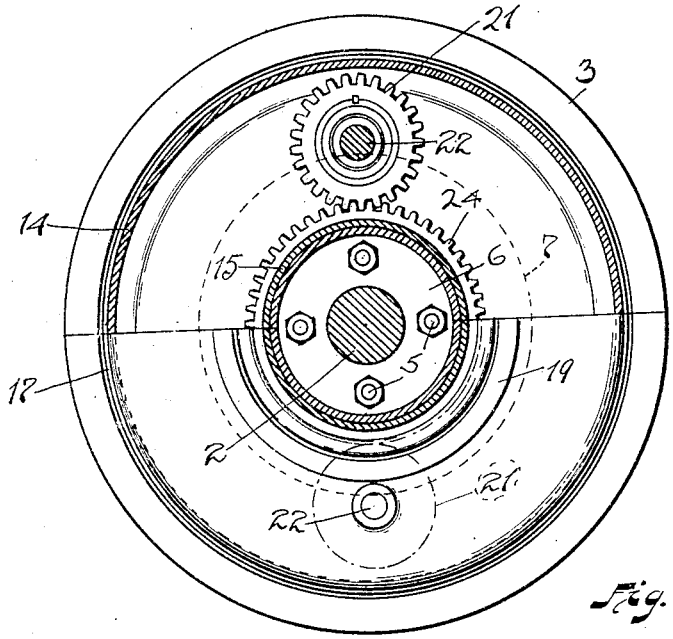
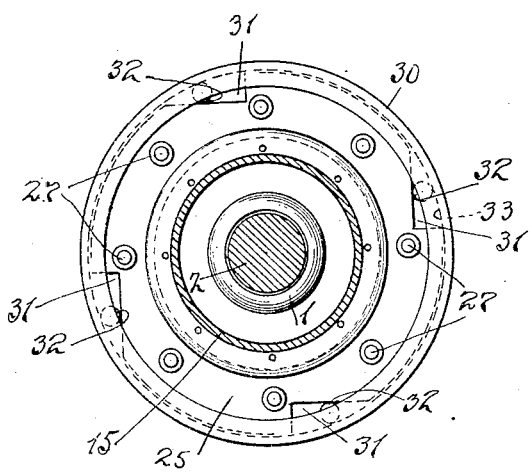

CYRUS B. KURTZ, OF GRINNELL, IOWA.

ELECTRIC MECHANISM FOR STARTING AUTOMOBILES AND THE LIKE.

1,230,175.  Specification of Letters Patent.  Patented June 19, 1917.

Application filed February 10, 1913, Serial No. 747,252. Renewed December 1, 1916. Serial No. 134,508.

*To all whom it may concern:*

Be it known that I, CYRUS B. KURTZ, a citizen of the United States, and a resident of Grinnell, county of Poweshiek, and State of Iowa, have invented a new and useful Improvement in Electric Mechanism for Starting Automobiles and the like, of which the following is a specification, the principle of the invention being herein explained and the best mode in which I have contemplated applying that principle, so as to distinguish it from other inventions.

The present improved electric mechanism, designed, as indicated, primarily for use in starting automobiles and the like is constructed on the principle of uni-polar or homo-polar induction. As is well known, strictly speaking there is no such thing as a uni-polar dynamo or uni-polar induction, since a single magnetic pole cannot exist by itself. However, continuous cutting of lines of magnetic force can exist, and produces, unlike the ordinary bi-polar induction, a continuous, or direct, current. Conversely, such a continuous current can be utilized for the production of movement in an armature, and this is the principle of construction involved in the present device where utilized as a motor, the device being also adaptable, for the production of a continuous, or direct, current, if desired. The object of the invention is the construction of a device of this sort of such compact form that it may be directly incorporated in an ordinary fly-wheel, such as is universally employed in connection with internal explosion motors, both in automobiles and elsewhere. To the accomplishment of this and related ends, the invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a partial longitudinal axial section and partial side elevation of a device embodying the present improvements, such device being shown as incorporated in a fly wheel, as just suggested; Fig. 2 is a part transverse section and a part end elevation of said motor, the plane of the section being indicated by the line 2—2, Fig. 1; and Fig. 3 is a transverse section taken on the plane 3—3, Fig. 1.

The device as shown in the foregoing described drawings, is primarily designed for use as a motor to positively rotate the crank-shaft of the engine in order to start the latter. The current, for present purposes, may be regarded as coming from the usual storage battery, to which such current is initially supplied from an outside source, a separate generator, or the device in hand operating as a generator.

The only portion of the internal combustion motor or engine appearing in the drawings is one end of the crank case 1 and a corresponding section of the crank-shaft 2, which projects without said case to receive the modified fly-wheel 3, in exactly the same fashion as it ordinarily receives the solid fly-wheel as at present constructed. This fly-wheel, furthermore, is shown as a part of a typical cone clutch, the opposing member 4, of which is shown in dotted outline only. Said fly-wheel 3 is conveniently secured to the crank shaft by means of bolts 5 passing through the same and a flange 6 on the crank shaft, and will be constructed of steel. While necessarily made in parts to permit of the inclusion therein of the coil 7 and other mechanism presently to be described, such fly-wheel may in effect be regarded as an integral structure through which the magnetic current will flow around the coil.

Such coil is of annular form solidly embedded in the fly-wheel as shown, being directly connected electrically at its inner terminal 8 with the material of the fly-wheel, while its other, outer terminal 9, although passing through the fly-wheel, is carried in a duct or passage 10 formed in the latter and is electrically insulated therefrom. This outer terminal 9 of the coil is, however, electrically connected with a plunger 11, preferably of brass, which is pressed, by means of a spring 12, radially inward so as to contact with a collecting ring 13.

Said collecting ring is part of a shell-like structure independent from, although carried by the fly-wheel just described. The main portion 14 of said shell is journaled on the hub 15 of the fly-wheel, which extends toward the crank case of the engine, ball races and balls, forming an anti-friction bearing 16, being introduced between said shell and hub. The inner portion 17 of the shell, to which the collecting ring 13 is attached, is similarly supported on an antifriction bearing 18 on the adjacent portion of the fly-wheel so that said shell as a whole is freely rotatable about the latter. Provision is made for conducting the current from the collecting rings 13 wherewith the brush 11 contacts, through said shell, to a second collecting ring 19 on the minor face of the shell, such provision including preferably the making of the shell of conducting material. Where the shell is thus utilized for the conduction of this current, it requires to be suitably insulated against electrical contact with the main body of the fly-wheel, as will be readily understood.

Carried by the main portion 14 of the shell are one or more pairs of pinions 20, 21, (preferably two or three such pairs of these will be employed), such pinions being mounted on stub shafts 22 and the first-named being keyed to the hub or otherwise non-rotatably secured to the last-named. While these pinions are of substantially the same diameter, they have different numbers of teeth as will be explained subsequently. The first pinion 20 meshes with gear teeth 23 formed directly on the hub of the fly-wheel as shown, while the other pinion 21 meshes with an adjacent annular gear 24, that is rotatably mounted on said hub, said annular gear extending without the shell and there being provided with a flange 25.

This gear 24, or rather the flange thereof, has good electrical contact with the hub of the fly-wheel, so that current received from a brush 26 bearing against the face of the disk may pass directly from such flange or gear through the hub and body of the fly-wheel to the inner terminal 8 of the field coil 7. From the outer extremity or terminal 9 of such coil the current path is through the plunger 11, the collector ring 13, and the parts 17 and 14 of the shell, which carries such current to the collector ring 19 on the inner face of the shell. Bearing against this last-named collector ring is a plunger or brush 27 that is carried by the flange 25 of the annular gear 24, but electrically insulated therefrom and connected with a third collecting ring 28, which is likewise electrically insulated from said flange. It is through this third collecting ring that the electric circuit with the source 29 of current supply is completed, as diagrammatically shown in Fig. 1.

The flange 25 of the gear, furthermore, is provided with a clutch co-acting with a fixed disk or equivalent member 30 rigidly attached to the crank case or other external part whereby rotation of the gear is permitted in one direction only. This member 25 and gear 24 when held from rotation by the clutch serve as a reaction member to absorb the external thrust of the starting action. A convenient form of clutch for use in this connection is provided by notching the periphery of the flange as shown in Fig. 3, and placing in such notches 31, balls 32 which are carried in a groove 33 in the fixed frame that surrounds the flange. It will be obvious, that by reason of the form of the notches, the balls 32 will wedge between the flange 25 and such stationary member 30, so as to prevent the flange from rotating to the right as viewed in said figure, while it may nevertheless rotate freely in the opposite direction.

It has been previously explained that the number of teeth on the two pinions 20 and 21 is different; similarly the number of teeth on the hub of the fly-wheel is different from the number on the annular gear, so that a differential effect is produced when said fly-wheel is rotated relatively to the gear; or, vice versa, so that the fly-wheel will be rotated when the shell is rotated, the ratio of gears being such that a considerable reduction occurs between the shell and the fly-wheel, assuming the former to be the driving member. Such shell does become the driving member if, with all the parts stationary, a current is passed through the field coil by closing the exterior portion of the circuit that is connected with the two collecting rings on the flange of the annular gear 24, since the path of the current through the shell cuts the lines of force of the field coil as indicated in the sectional portion of Fig. 1. There will, accordingly, be a reaction between said shell, which may be regarded as an armature, and the fly-wheel with the field coil carried thereby. The direction of the resulting rotation of the armature is such that it will tend to turn the annular gear to the right, that is in a clock-wise direction, as shown in Fig. 3. Such rotation, however, is prevented by the action of the clutch between the flange and the stationary member 30. Thereupon any further rotation of the armature will cause the fly-wheel to rotate, but at a reduced speed, depending upon the gear ratios, which may be readily calculated to give any desired result in this particular.

A gear ratio of 103 to 1 will figure up a voltage of six at sixty R. P. M. of the fly-wheel or field.

The direction of rotation of the elements in the present construction is determined by the gear ratio. If it be assumed that the gear 24 on the stationary member has twenty teeth, the gear 21 nineteen teeth, the gear 20 twenty-one teeth, and the gear 23 eighteen teeth, then the armature and fly-wheel will be revolving in opposite directions, but this can be changed by merely varying the number of teeth of the gears. The advantage of having the armature and field rotating in opposite directions is, of course, to secure greater relative speed between the two elements.

In case it is desired to have the armature and field rotating in the same direction some other gear ratio must be used such, for example, as nineteen teeth on the gear 24, twenty teeth on the gear 21, eighteen teeth on the gear 20, and twenty-one teeth on the gear 23. In this combination the field and armature are rotating in the same direction as can be readily calculated from the above data.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a combustion engine and a reaction member; of a field connected to said combustion engine, an armature arranged to cut the lines of magnetic force of said field, and a mechanical driving connection between said field and re-action member, said connection being controlled by the operation of said armature.

2. The combination with a combustion engine and a reaction member; of rotatable dynamo electric members, one being connected to said combustion engine, and differential mechanism connected to each of said dynamo electric members and to said reaction member, and electrical connections adapted to operate said dynamo members.

3. In mechanism of the character described the combination of a rotatable field member, and a rotatable member arranged to continuously cut the lines of magnetic force of said field member, a non-rotatable gear member, and gearing connecting said field and armature members, said armature member carrying a gear engaging said non-rotatable gear member to produce rotation of said field member.

4. In mechanism of the character described, the combination of a rotatable field member; a rotatable armature member arranged to continuously cut the lines of magnetic force of said field member; a gear member adapted to turn in one direction only; and pinions carried by said armature member and engaging said field member and gear, respectively, said pinions being adapted to produce a relative rotation between said field and armature members.

5. In mechanism of the character described, the combination of a rotatable field member; a rotatable armature member arranged to continuously cut the lines of magnetic force of said field member; gear teeth on said field member; a co-axial gear; a clutch coöperating with said gear to permit its rotation in one direction only; and pinions carried by said armature member and meshing with the teeth on said field member and gear respectively, the ratios between said pinions and the respective gears wherewith they mesh being different.

6. In mechanism of the character described, the combination of the fly wheel of an internal combustion motor; a field coil carried by said wheel and surrounding the latter's axis; a rotatable shell co-axial with said wheel; a conductor carried by said shell so as to continuously cut the lines of magnetic force of said field coil; and gearing connecting said shell and wheel, whereby they may rotate together but at different speeds.

7. In mechanism of the character described, the combination of the fly wheel of an internal combustion motor; a field coil carried by said wheel and surrounding the latter's axis; a rotatable shell co-axial with said wheel; a conductor carried by said shell so as to continuously cut the lines of magnetic force of said field coil; a gear member adapted to turn in one direction only; and pinions carried by said shell and engaging said wheel and gear, respectively, said pinions being adapted to produce a relative rotation between said wheel and shell.

8. In mechanism of the character described, the combination of the fly wheel of an internal combustion motor; a field coil carried by said wheel and surrounding the latter's axis; a rotatable shell co-axial with said wheel; a conductor carried by said shell so as to continuously cut the lines of magnetic force of said field coil; gear teeth on said wheel; a co-axial gear; a clutch coöperating with said gear to permit its rotation in one direction only; and pinions carried by said shell and meshing with the teeth on said wheel and gear, respectively, the ratios between said pinions and the respective gears wherewith they mesh being different.

Signed by me, this 4 day of February, 1913.

CYRUS B. KURTZ.

Attested by—
E. M. MULLIN,
L. G. LEMLEY.

Copies of this patent may be obtained for five cents each, by addressing the "Commissioner of Patents, Washington, D. C."